(12) United States Patent
Bech

(10) Patent No.: US 8,585,367 B2
(45) Date of Patent: Nov. 19, 2013

(54) WIND TURBINE, A METHOD FOR SERVICING A MAIN BEARING UNIT OF A WIND TURBINE AND USE THEREOF

(75) Inventor: Anton Bech, Ringkøbing (DK)

(73) Assignee: Vestas Wind Systems A/S, Aarhus N (DK)

( * ) Notice: Subject to any disclaimer, the term of this patent is extended or adjusted under 35 U.S.C. 154(b) by 342 days.

(21) Appl. No.: 12/511,565

(22) Filed: Jul. 29, 2009

(65) Prior Publication Data

US 2009/0285693 A1 Nov. 19, 2009

Related U.S. Application Data

(63) Continuation of application No. PCT/DK2007/000047, filed on Jan. 31, 2007.

(51) Int. Cl.
*F03D 1/00* (2006.01)
*F03D 11/00* (2006.01)

(52) U.S. Cl.
USPC ........ 416/174; 416/170 R; 384/461; 384/537; 384/542; 29/898.08; 29/402.01

(58) Field of Classification Search
USPC ....... 415/229; 416/170 R, 174, 244 R, 244 A, 416/DIG. 6; 290/44, 55; 384/461, 537, 542; 29/898, 898.01, 898.061, 898.062, 29/898.064, 898.07, 898.08, 898.09, 29/402.01, 525.01
See application file for complete search history.

(56) References Cited

U.S. PATENT DOCUMENTS

| 1,506,856 | A | * | 9/1924 | McCluskey | 384/461 |
| 2,789,021 | A | * | 4/1957 | Pedersen | 384/461 |
| 4,573,811 | A | | 3/1986 | Andree et al. | |
| 6,232,673 | B1 | | 5/2001 | Schoo et al. | |
| 8,403,786 | B2 | * | 3/2013 | Bech | 475/5 |
| 2003/0086631 | A1 | | 5/2003 | Faltus et al. | |
| 2003/0147751 | A1 | * | 8/2003 | Wobben | 416/174 |
| 2004/0108733 | A1 | * | 6/2004 | Wobben | 290/55 |
| 2004/0232704 | A1 | * | 11/2004 | Casazza et al. | 290/55 |
| 2005/0148425 | A1 | * | 7/2005 | Nakagawa et al. | 475/348 |

FOREIGN PATENT DOCUMENTS

| FR | 2749358 A1 | 12/1997 |
| WO | 03014567 A1 | 2/2003 |

OTHER PUBLICATIONS

International Search Report, Aug. 11, 2007 (3 pages).
International Preliminary Report on Patentability; PCT/DK2007/000047; Jul. 28, 2009; 11 pages.
Written Opinion of the International Searching Authority; PCT/DK2007/000047; Oct. 30, 2007; 5 pages.

* cited by examiner

*Primary Examiner* — Christopher Verdier
(74) *Attorney, Agent, or Firm* — Wood, Herron & Evans, LLP

(57) ABSTRACT

A wind turbine includes a nacelle and a rotor, the rotor being rotatably mounted on the nacelle by means of at least one main bearing unit. The wind turbine is characterized in that the main bearing unit includes at least one outer ring, at least one center ring and at least one inner ring and wherein the center ring is capable of rotation in relation to the outer ring and the inner ring or the outer ring and the inner ring are capable of rotation in relation to the center ring. A method for servicing a main bearing unit of a wind turbine and a use hereof are also provided.

15 Claims, 7 Drawing Sheets

WIND TURBINE, A METHOD FOR SERVICING A MAIN BEARING UNIT OF A WIND TURBINE AND USE THEREOF

CROSS-REFERENCE TO RELATED APPLICATIONS

The present application is a continuation of pending International patent application PCT/DK2007/000047 filed on Jan. 31, 2007 which designates the United States, the content of which is incorporated herein by reference.

FIELD OF THE INVENTION

The invention relates to a wind turbine comprising a nacelle and a rotor, said rotor being rotatably mounted on said nacelle by means of at least one main bearing unit, the invention also relates to a method for servicing a main bearing unit of a wind turbine and use hereof.

BACKGROUND OF THE INVENTION

A wind turbine known in the art comprises a wind turbine tower and a wind turbine nacelle positioned on top of the tower. A wind turbine rotor with a number of wind turbine blades is connected to the nacelle through a low speed shaft, as illustrated on FIG. 1.

Somewhere between the nacelle and the rotor the wind turbine is typically provided with a main bearing unit to ensure substantially frictionless rotation of the rotor in relation to the nacelle while transferring the load or loads from the rotor to the nacelle.

Previously at this main bearing unit, often one or more relatively small bearings enclose a solid or at least a very thick-walled low speed shaft, but as wind turbines have grown bigger and bigger both in output and in size, the trend today is more towards large diameter main bearing units e.g. enclosing the gearbox as disclosed in U.S. Pat. No. 6,232,673 B1.

For such a main bearing unit to be efficient it has to be very rigid or at least rigidly mounted on very rigid parts of the hub and/or the nacelle and the more load the bearing unit has to transfer or the bigger diameter the main bearing unit has, the more costly it is to obtain satisfactory rigidity.

An object of the invention is to provide for a method and a wind turbine comprising a main bearing unit, which is advantageous for the operation of large modern wind turbines.

SUMMARY OF THE INVENTION

The invention provides for a wind turbine comprising a nacelle and a rotor. The rotor being rotatably mounted on the nacelle by means of at least one main bearing unit. The wind turbine is characterized in that the main bearing unit comprises at least one outer ring, at least one centre ring and at least one inner ring and wherein the centre ring is capable of rotation in relation to the outer ring and the inner ring or the outer ring and the inner ring are capable of rotation in relation to the centre ring.

A main bearing unit where a centre ring is capable of rotation between an outer and an inner ring is advantageous for the operation of the wind turbine because the main bearing unit is more efficient in transferring radial loads in both radial directions.

It should be emphasized that the term "main bearing unit" is to be understood as the bearing or bearings transferring the bulk of the load of the rotor to the rest of the wind turbine while at the same time allowing that the rotor can rotate in relation to the nacelle. "the load of the rotor" could be the weight of the rotor, the axial wind load, torsion originating from differences in wind load over the rotor plane and/or other.

In an aspect of the invention, said at least one outer ring and said at least one inner ring are rigidly connected.

E.g. if the outer ring is rigidly connected to the rotor and the centre ring is connected to the nacelle, the load from gravity acting on the rotor will pull the outer ring down against the centre ring at the top part of the main bearing unit. This great radial load is transferred to the nacelle through the centre ring but it will also try to pull the inner ring away from the centre ring hereby increasing the risk of the main bearing unit being damaged. If the inner ring and the outer ring are rigidly connected the distance between the inner surface of the outer ring and the outer surface of the inner ring is maintained substantially constant at all times, whereby reducing the risk of malfunction or damage.

Furthermore, if the outer ring and the inner ring are rigidly connected the abovementioned load will be transferred by the outer ring at the top and by the inner ring at the bottom substantially without the outer ring and the inner ring being mutually displaced, hereby enabling that even though this load would force the rings into a slightly oval shape main bearing unit is still self-tracking, in that the centre ring is substantially rigidly guided by the outer ring and the inner ring and the main bearing unit is thereby less depending on rigidity of the surrounding structure to which it is attached or integrated.

It should be emphasized that the term "rigidly connected" is to be understood as the at least one outer ring and the at least one inner ring being substantially inflexibly fixed in relation to each other i.e. neither of said rings can rotate or move radial or axially in relation to the other.

In an aspect of the invention, said at least one outer ring and said at least one inner ring are attached to a hub of said rotor.

Hereby is enabled an advantageous design regarding the transferring of the loads from the rotor to the nacelle.

In an aspect of the invention, said at least one centre ring is attached to a hub of said rotor.

Hereby is enabled an advantageous design regarding the transferring of the loads from the rotor to the nacelle.

In an aspect of the invention, said attachment is made by means of attachment means such as screws, bolts or studs.

Attachment means such as screws, bolts or studs enables that the rings can be dismantled hereby enabling easy access to the inner parts of the main bearing unit.

In an aspect of the invention, said at least one centre ring is formed integrally with a hub of said rotor.

Forming the centre ring integrally with the hub of the rotor is advantageous in that this provides for a simple main bearing unit design.

In an aspect of the invention, said main bearing unit and/or said wind turbine comprises means for allowing said outer ring or at least a part of said outer ring to be displaced axially.

By enabling the outer ring or a part of the outer ring to be axially displaced, access to the internal parts between the outer ring and the centre ring is enabled. This is advantageous in that damage or wear to the internal parts becomes easier to repair.

The internal parts could e.g. comprise one or more rows of rolling elements, one or more cages for guiding the rolling elements and/or one or more raceways.

In an aspect of the invention, said main bearing unit and/or said wind turbine comprises means for allowing said inner ring or at least a part of said inner ring to be displaced axially.

By enabling the inner ring or a part of the inner ring to be axially displaced, access to the internal parts between the inner ring and the centre ring is enabled. This is advantageous in that damage or wear to the internal parts becomes easier to repair.

In an aspect of the invention, said at least one outer ring and/or said at least one inner ring and/or a part of said at least one outer ring and/or a part of said at least one inner ring are divided into two or more segments.

Dividing the rings or parts of the rings into two or more segments is advantageous in that the rings hereby are easier to dismantle.

In an aspect of the invention, said at least one centre ring comprises at least two separate but rigidly connected bearing rings.

The main bearing unit could e.g. comprise an outer bearing with an inner ring and an outer ring and an inner bearing with an inner ring and an outer ring. If the outer bearing e.g. was bigger in diameter than the inner bearing, the inner ring of the outer bearing and the outer ring of the inner bearing could be rigidly joined to form a centre ring of a main bearing unit according to the invention. This is advantageous in that in that it provides for a simple design.

In an aspect of the invention, said main bearing unit comprises at least one row of rolling elements between said at least one outer ring and said at least one centre ring and at least one row of rolling elements between said at least one inner ring and said at least one centre ring.

Rolling elements between the rings are an advantageous way of providing for a low-friction rotating joint.

In an aspect of the invention, said rolling elements in said rows are maintained separated by one or more cages.

Hereby is provided for an advantageous embodiment of the invention in that the rolling elements in a row are prevented from rubbing against each other and in that the load-transmitting contact surfaces are maintained evenly distributed around the entire bearing rings.

In an aspect of the invention, one or more of said cages are divided into one or more segments.

To enable that the cages can be dismantled on-site it is advantageous that the cages are divided into one or more segments.

It should be emphasized that by the term "segment" is to be understood that the cage is divided into one or more parts divided by one or more cuts in the axial plane parallel with the rotational axis of the main bearing unit.

That the cage can be divided into one segment means that the full-circle cage ring is open in one place.

In an aspect of the invention, said at least one outer row of rolling elements are at least two separate rows of rolling elements.

The more rows of rolling elements the more load-transmitting contact surfaces it is possible to provide the ring with hereby reducing the load transferred through each contact point. But the more rows the higher the production cost and two rows therefore provide for an advantageous relation between efficiency and cost.

In an aspect of the invention, said at least one inner row of rolling elements are at least two separate rows of rolling elements.

In an aspect of the invention, said at least two separate rows of rolling elements comprise a first row of rolling elements including rolling elements of a first size and a second row of rolling elements including rolling elements of a second size wherein said first size is different from said second size.

The rolling element in the different rows between e.g. the outer ring and the centre ring is not necessarily evenly loaded in that one or more rows could be adapted to specifically handle axial load and other rows could be adapted to specifically handle radial loads. These loads are not necessarily the same and it is therefore advantageous to adapt the size of the rolling elements to the size of the loads they have to handle.

It should be emphasized that by the term "size" is to be understood that the rolling elements are of different shape or that one or more dimensions of the rolling elements differ.

In an aspect of the invention, said at least two separate rows of rolling elements comprise a first row of rolling elements at a first pitch diameter and a second row of rolling elements at a second pitch diameter and wherein said first pitch diameter is different from said second pitch diameter.

Hereby is achieved an advantageous embodiment of the invention.

In an aspect of the invention, said at least one outer ring and/or said at least one centre ring and/or said at least one inner ring comprise one or more separate raceways.

The raceway is the part of the bearing rings that comprises the surface on which the rolling elements roll during normal operation of the bearing. This contact surface between the rings and the rolling elements are highly strained because a large load has to be transferred through the relatively small contact surface and it is therefore advantageous to make the raceway a separate part from the rest of the ring to enable that only the raceway and not the entire ring would have to be replaced in case of wear, damage or other.

Furthermore, it should be emphasized that by the term "separate" is to be understood that the raceway is a separate part, which can be detached from the ring. The raceway or raceway parts are mounted in or at least to some degree fixated by the bearing ring but it is not formed integrally with the ring and can therefore e.g. be made from a different material.

In an aspect of the invention, said at least one centre ring comprises one or more separate raceways.

Hereby is achieved an advantageous embodiment of the invention.

In an aspect of the invention, one or more of said separate raceways are divided into segments.

Hereby is easier dismantling of the raceways enabled.

The invention further provides a method for servicing a main bearing unit of a wind turbine according to any of the previous claims. The method comprises the steps of stopping the rotation of the rotor in relation to the nacelle, and moving an inner ring or a part of an inner ring of the main bearing unit while an outer ring and a centre ring of the main bearing unit remains load-transmitting, or moving an outer ring or a part of an outer ring of the main bearing unit while an inner ring and a centre ring of said main bearing unit remains load-transmitting.

Hereby is provided for a method, which is advantageous for the operation of large modern wind turbines in that it hereby is possibly in a simple and inexpensive way to service the main bearing unit without e.g. having to remove the entire rotor.

It should be emphasized that by the term "remains load-transmitting" is to be understood that the main bearing unit continues with being able to transfer load via one or more rolling element rows of the main bearing unit even though servicing of one or parts of the main bearing unit is in progress i.e. one or more bearing rings is extricated.

In an aspect of the invention, said method further comprises the step of disengaging said inner ring or said part of said inner ring or said outer ring or said part of said outer ring of said main bearing unit.

Disengaging the one or more rings or one or more parts of the rings before the rings or parts are moved is advantageous, in that it provides for a simple and easy way of servicing the rings or at least the internal parts between the rings and the centre ring.

It should be emphasized that by the term "disengaging" is to be understood any kind of un-attaching, disassembling, unscrewing or in other ways releasing the ring or ring parts from its previous attachment to a structure of the wind turbine such as removing or unscrewing the bolts or studs connecting the ring or ring part to a hub, a nacelle structure or to a gearbox part.

In an aspect of the invention, said method further comprises the step of reattaching said inner ring or said part of said inner ring or said outer ring or said part of said outer ring of said main bearing unit.

Reattaching the one or more rings or one or more parts of the rings after the rings or parts have been moved is advantageous, in that it provides for a simple and easy way of servicing the rings or at least the internal parts between the rings and the centre ring.

It should be emphasized that by the term "reattaching" is to be understood any kind of refasten, reconnecting, reassembling in other ways rejoining the ring or ring parts to a structure of the wind turbine such as reattaching the ring or ring part to a hub, a nacelle structure or to a gearbox part by means of attachment means such as bolts or studs.

In an aspect of the invention, said load-transmitting involves carrying the entire weight of said rotor.

Hereby is achieved an advantageous embodiment of the invention.

In an aspect of the invention, said method is a method for accessing the internal parts of said main bearing unit.

Accessing the internal parts of the main bearing unit during servicing of the main bearing unit is advantageous in that the internal parts often are heavily loaded and therefore the most vulnerable parts of the bearing unit.

In an aspect of the invention, said inner ring or said part of said inner ring is moved to gain access to internal parts between said centre ring of said main bearing unit and said inner ring.

Hereby is achieved an advantageous embodiment of the invention.

In an aspect of the invention, said outer ring or said part of said outer ring is moved to gain access to internal parts between said centre ring of said main bearing unit and said outer ring.

Hereby is achieved an advantageous embodiment of the invention.

In an aspect of the invention, said inner ring or said part of said inner ring or said outer ring or said part of said outer ring is moved axially to enable access to the internal parts of said main bearing unit.

If the rings or ring parts are moved axially it is possible for the rings or ring parts to be formed as full unbroken rings which is advantageous in that the rings hereby are very strong towards pull and in that a axially movement enables that the entire ring or ring part is moved at once.

In an aspect of the invention, said internal parts comprise one or more rows of rolling elements, one or more cages and one or more raceways.

Hereby is achieved an advantageous embodiment of the invention.

In an aspect of the invention, said method is further a method to level out the wear of one or more parts of said main bearing unit.

Servicing the main bearing unit by evening out the abrasion of one or more parts of the main bearing unit is advantageous in that it among other things provides for a simple way of prolonging the life of the parts.

In an aspect of the invention, said one or more parts comprise the region of the stationary bearing rings of said main bearing unit which are in direct contact with rolling elements of said main bearing unit.

By levelling out the wear of the rings or the separate raceways inserted in the rings the life of the rings or the separate raceways can be prolonged and/or they become more inexpensive.

It should be emphasized that by the term "stationary" is to be understood the bearing ring or rings which do not rotate during normal operation of the wind turbine i.e. the ring or rings being rigidly connected to or integrated in the nacelle.

In an aspect of the invention, said stationary bearing rings are the one or more rings of said main bearing unit which are fixed in relation to said nacelle during normal operation of said wind turbine.

Hereby is achieved an advantageous embodiment of the invention.

It should be emphasized that by the term "fixed" is to be understood that the bearing ring or rings and the nacelle substantially do not in any way move, rotate or other in relation to each other.

In an aspect of the invention, said moving an inner ring or a part of an inner ring involves rotating said inner ring or said part of said inner ring of said main bearing unit away from a previous angle-position.

If the stationary rings of the main bearing unit always or mostly see a predominant load in one direction some areas of these bearing rings will be subject to more abrasion than other areas or the of the rings and it is therefore advantageous to service the main bearing unit by rotating these rings to a new angular position to level out the wear of the rings.

In an aspect of the invention, said moving an outer ring or a part of an outer ring involves rotating an outer ring or a part of an outer ring of said main bearing unit away from a previous angular-position.

Hereby is achieved an advantageous embodiment of the invention.

In an aspect of the invention, said rings or said part of said rings of said main bearing unit are reattached in a new angle-position.

Hereby is achieved an advantageous embodiment of the invention.

The invention further provides for use of a method for changing the main bearing unit on a wind turbine as described above, wherein said wind turbine is a direct driven wind turbine or a wind turbine comprising a gearbox.

Hereby is achieved an advantageous embodiment of the invention.

BRIEF DESCRIPTION OF THE DRAWINGS

The invention will be described in the following with reference to the figures in which.

DETAILED DESCRIPTION OF THE INVENTION

Figure 1:
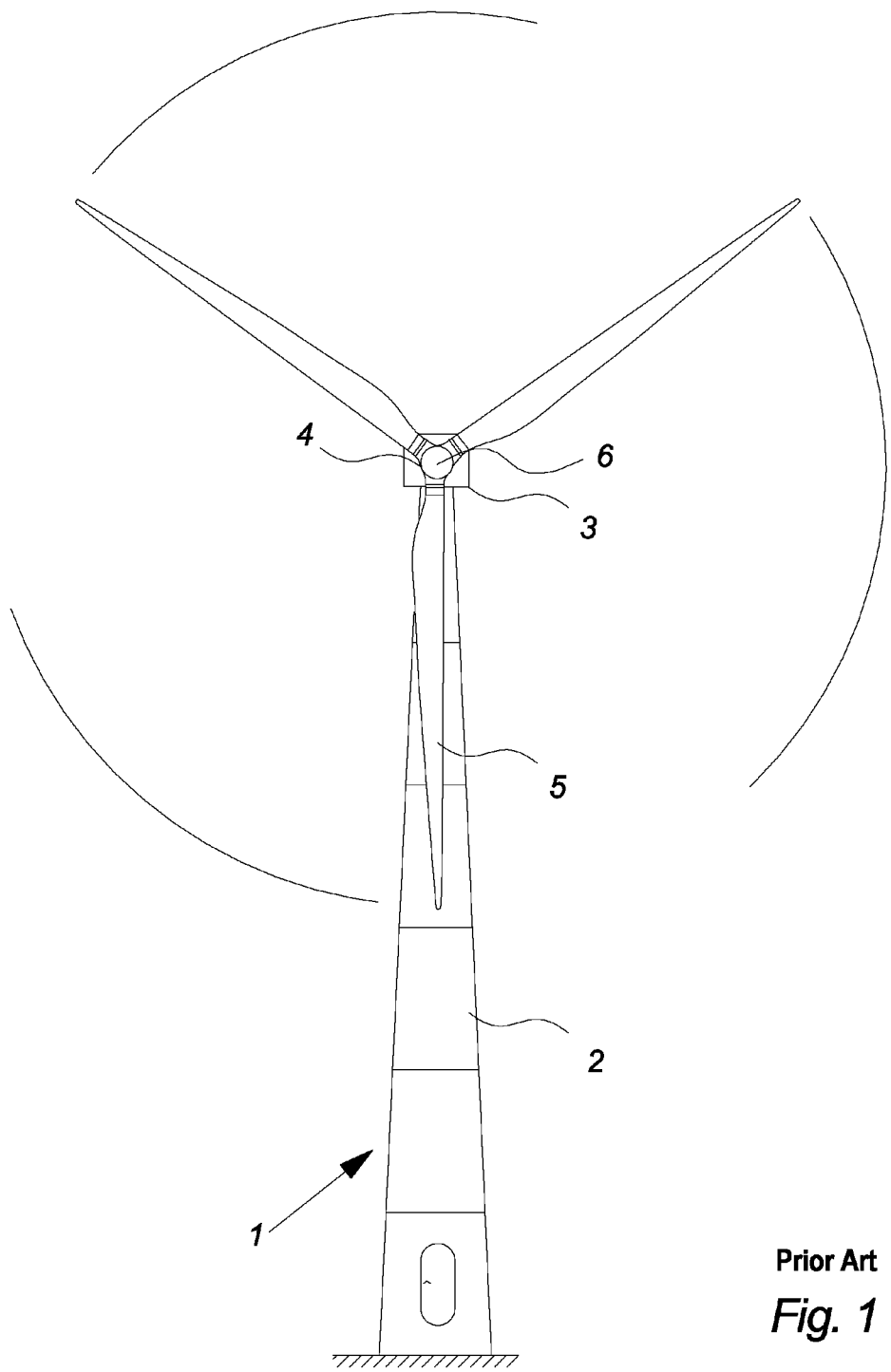
FIG. 1 illustrates a large modern wind turbine as seen from the front.

FIG. 1 illustrates a wind turbine 1, comprising a tower 2 and a wind turbine nacelle 3 positioned on top of the tower 2. The wind turbine rotor 4, comprising three wind turbine blades 5 mounted on a hub 6, is connected to the nacelle 3 through the low speed shaft which extends out of the nacelle 3 front.

Figure 2:
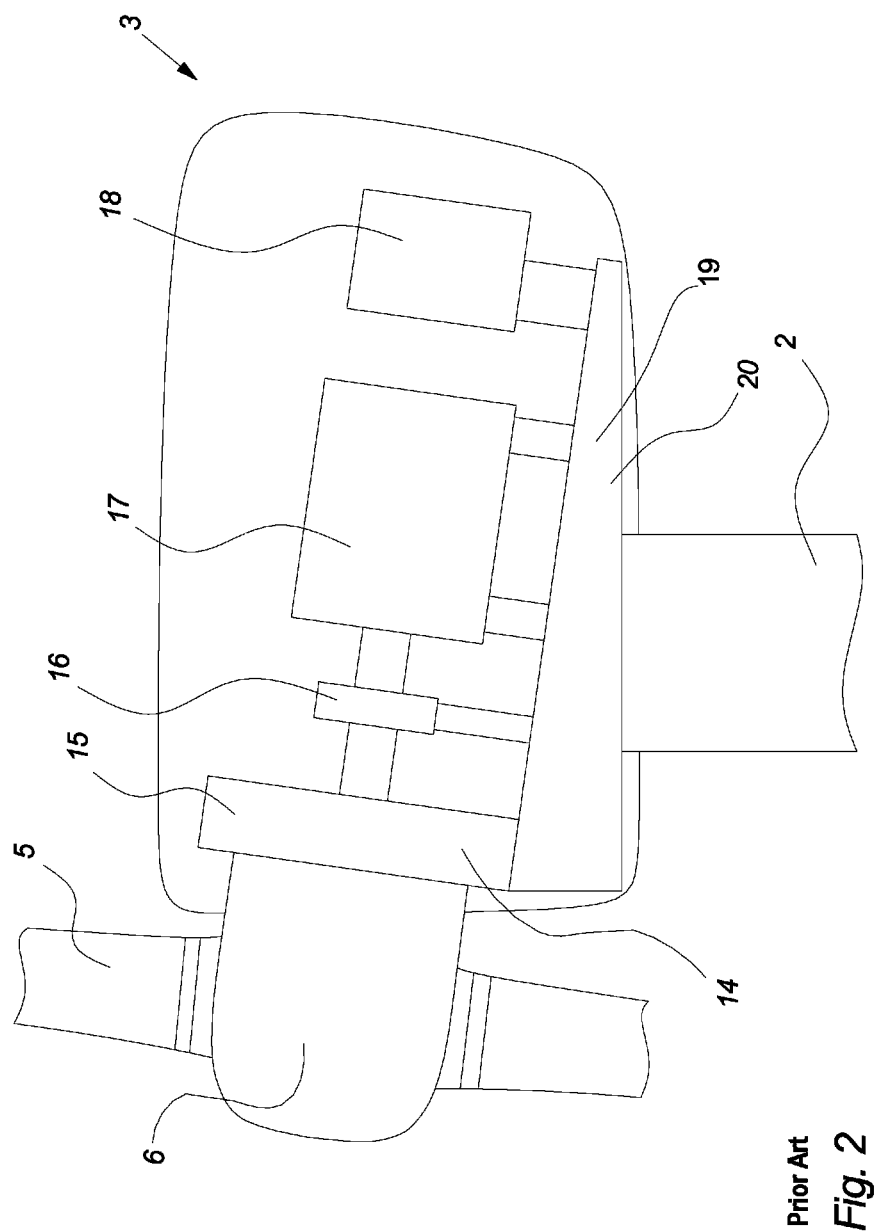
FIG. 2 illustrates a cross section of an embodiment of simplified nacelle known in the art, as seen from the side.

FIG. 2 illustrates a simplified cross section of a nacelle 3 of a prior art wind turbine 1, as seen from the side. Nacelles 3 exists in a multitude of variations and configurations but in most cases the drive train in the nacelle 3 almost always comprise one or more of the following components: a gearbox 15 (typically a epicyclical gearbox), a coupling (not shown), some sort of braking system 16 and a generator 17. A nacelle 3 of a modern wind turbine 1 can also include a converter 18 (also called an inverter) and additional peripheral equipment such as further power handling equipment, control cabinets, hydraulic systems, cooling systems and more.

The weight of the entire nacelle 3 including the nacelle components 15, 16, 17, 18 is carried by a strengthening structure 19. The components 15, 16, 17, 18 are usually placed on and/or connected to this common load carrying structure 19. In this simplified embodiment the load carrying structure 19 only extends along the bottom of the nacelle 3 e.g. in form of a bed frame to which some or all the components 15, 16, 17, 18 are connected. In another embodiment the load carrying structure 19 could comprise a gear bell which through the main bearing unit 14 could transfer the load of the rotor 4 to the tower 2, or the load carrying structure 19 could comprise several interconnected parts such as latticework.

The nacelle further comprises a main bearing unit 14 for ensuring that the rotor 4 can rotate substantially freely in relation to the nacelle 3 and the fixed drive train parts 15, 16, 17, 18 of the nacelle 3. In this embodiment of a drive train the main bearing unit 14 is integrated in the gearbox 15 in that the rotor 4 is connected directly to the gearbox 15 via the hub 6. Because the main bearing 14 is incorporated in the gearbox 15, the gearbox structure has to be able to transfer the entire load of the rotor 4 to the tower 2 by means of the nacelle strengthening structure 19.

In this embodiment of the invention the drive train is established in a normal operation angle NA of 8° in relation to a plane perpendicular to a centre axis through the tower 2 i.e. a horizontal plane. The drive train is for among other reasons angled to enable that the rotor 4 can be angled correspondingly e.g. to ensure that the blades 5 do not hit the tower 2, to compensate for the differences in wind speed at the top and bottom of the rotor 4 and other.

Figure 3:
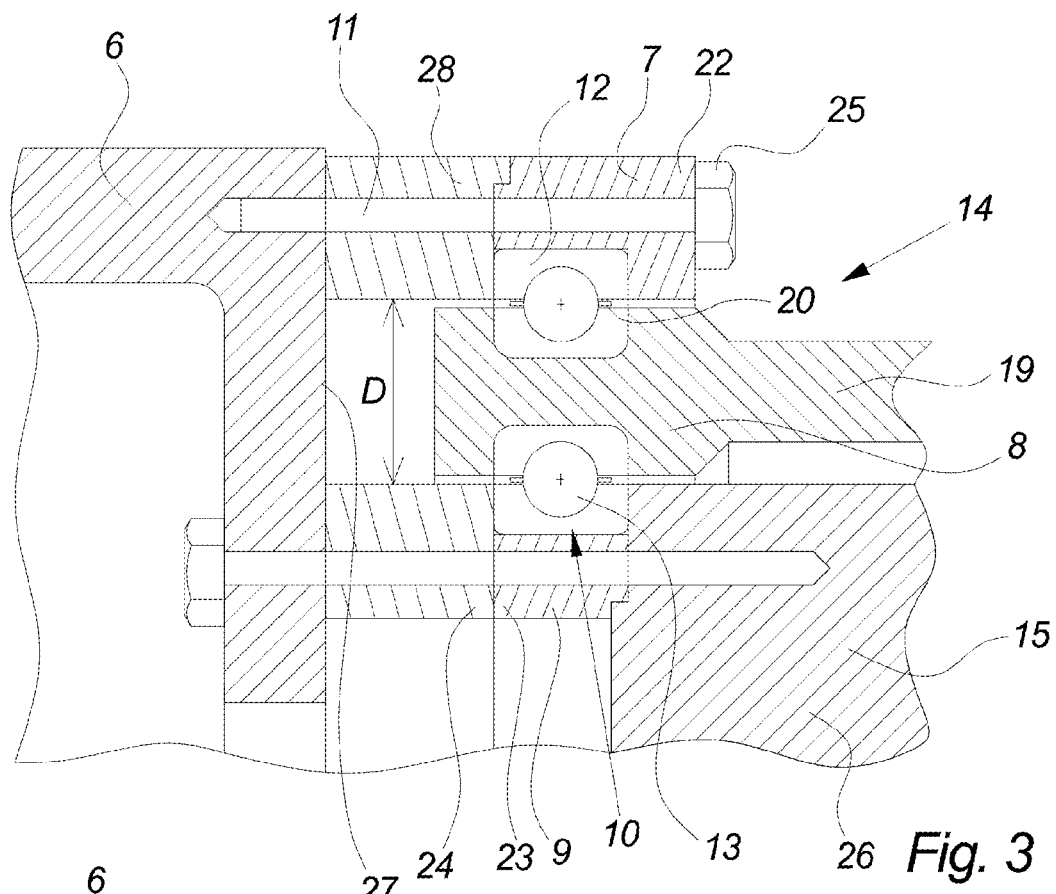
FIG. 3 illustrates a part of a cross section of an embodiment of a main bearing unit according to the invention mounted in the drive train of a wind turbine, as seen from the side.

FIG. 3 illustrates a part of a cross section of an embodiment of a main bearing unit 14 according to the invention mounted in the drive train 12 of a wind turbine 1, as seen from the side.

In this embodiment of the invention the inner ring 9 and the outer ring 7 of the main bearing unit 14 are rigidly connected to the wind turbine hub 6 by means of attachment means 25 which in this case is bolts.

In another embodiment the inner ring 9 and the outer ring 7 could be connected to another part such as the strengthening structure 19 of the nacelle, the wind turbine gearbox 15, a part of the gearbox such as the planet carrier 26, the annulus ring (not shown) or to any other part either on the rotor 4 or on the nacelle 3 or either both or one of the inner ring 9 and the outer ring 7 could entirely or partly be formed integrally with the hub 6, the strengthening structure 19 of the nacelle, the gearbox 15 or any other part of the rotor 4 or the nacelle 3 or the inner ring 9 and the outer ring 7 could be formed as a single e.g. U-shaped part where the two "legs" in the U would be the inner ring 9 and the outer ring 7 of the main bearing unit 14 being integrally joined by a cross-part.

In this embodiment the inner ring 9 and the outer ring 7 are connected to the same part but in another embodiment the rings 7, 9 could be connected to different parts where these different parts then would be rigidly connected.

It is important that the inner ring 9 and the outer ring 7 are rigidly connected to ensure that the internal distance D between the inner ring 9 and the outer ring 7 at all times are maintained substantially constant and uniform all the way around the bearing rings 7, 8, 9 to prevent the rolling elements 13 from leaving their correct position between the rings e.g. by running on the edges of the raceways 12 or other which could damage or reduce the life of the main bearing unit 14 or parts thereof. Hereby is the operation of the main bearing unit 14 ensured even though the main bearing unit 14 should be deflected e.g. making a specific point on the rotating part of the main bearing unit 14 describes something else than a perfect circle such as an elliptic curve. The operation of the main bearing unit 14 is ensured because the inner ring 9 and the outer ring 7 always will keep the centre ring 8 in its right position no matter the direction of the load (radial in or outwards, axially forward and back or any combination hereof) the main bearing unit 14 has to transfer. The main bearing unit 14 hereby becomes self-tracking in that the center ring 8 at all times is guided substantially precisely between the inner ring 9 and the outer ring 7 substantially no matter if the bearing is slightly oval or other.

In this embodiment of the invention the wind turbine 1 does not have a low speed shaft as such, in that the rotor 4 is directly connected to the planet carrier 26 of the epicyclic gearbox establishing the connection between the rotor 4 and the nacelle 3 along the outer edge of the hub flange 27, making the main bearing unit 14 has a relative large diameter such as between 1 and 5 meters, preferably between 1.8 and 3.5 meters. FIGS. 3 to 8 therefore illustrate a cross section of one side of the main bearing unit 14 at the upper side of the nacelle 3 at a distance of e.g. 1.2 meters from the rotational axis of the rotor, making the diameter of this embodiment of a main bearing unit 14 according to the invention approximately 2.4 meters in diameter.

In another embodiment of the invention the main bearing unit 14 could be placed at another diameter e.g. by enclosing a smaller diameter main shaft or other.

In this embodiment the main bearing unit 14 only comprises one centre ring, one outer ring 7 (even though this outer ring 7 is divided into more than one juxtaposed ring parts 22, 28) and one inner ring 9 (even though this inner ring 9 is divided into more than one juxtaposed ring parts 23, 24) but in another embodiment the main bearing unit 14 could comprise more than one of each of these rings 7, 8, 9.

In this embodiment of the invention the centre ring 8 is formed as one single ring but in another embodiment the centre ring 8 could also be formed as a number of concentric rings such as two individual rings each mounted substantially on the same wind turbine part such as on the hub 6 or on a part of the nacelle 3 such as a part of the gearbox 15. The centre rings 8 just have to be rigidly connected to ensure that the main bearing unit 14 is capable of efficiently transferring load in both radial directions.

In this embodiment of the invention the centre ring 8 is formed integrally with the strengthening structure 19 of the nacelle 3 but in another embodiment the centre ring 8 could be a separate part connected rigidly to or at least substantially rigidly to the strengthening structure 19 of the nacelle 3 or another more or less stationary or rotating part of the nacelle 3 or if the inner ring 9 and outer ring 7 were connected to the nacelle 3 the centre ring 8 could be connected to the rotor 4 e.g. via the hub flange 27.

In this embodiment of the invention the three-ring design could also be used for evening out the abrasion of the stationary ring or rings 7, 8, 9 and/or the abrasion of the raceway 12 of the stationary ring or rings 7, 8, 9. The stationary raceways 12 in such an arrangement (those mounted to the nacelle 3) will see a predominant load direction due the rotor 4 own weight, and the tilt moment resulting from the blade 5 own weight. This will cause a higher rate of fatigue and wear in certain regions of the stationary ring or rings. E.g. if one now chooses to mount the inner ring 9 and outer ring 7 to the stationary nacelle structure 19, and the center ring 8 to the rotating part (hub 6), then these regions of increased fatigue and wear will occur in defined areas of these stationary rings 7, 9. Now, one may execute the main bearing unit 14 such that either the inner ring 9 or the outer ring 7 can support the rotor 4 alone, at least in static conditions. This means that one could design the main bearing unit 14 such that one removes the attachment means 25 of the outer ring 7, rotates the outer ring 7 e.g. 180 degrees, reattaches the outer ring 7, then removes the attachment means 25 of the inner ring 9, rotates this by e.g. 180 degrees and reattaches the inner ring 9 by means of the attachment means 25. This means that the higher loaded bearings rings 7, 8, 9 after some share of their lifetime will continue to run on the hereto unloaded area. In essence, one can design each contact just for a fraction of the system design lifetime.

In this embodiment of the invention the bearing rings 7, 8, 9 are all substantially perfectly round when initially mounted but in another embodiment of the invention the rings 7, 8, 9 could be formed e.g. oval to pre-compensate for e.g. static deadweight. The deadweight of the rotor 4 could cause a static offset in vertical direction, and could therefore cause a misalignment of the gearbox 15 or generator 17 towards its mount (nacelle 3 or at least nacelle structure 19). This offset is quite well-defined by the masses of the components 4, and the stiffness of the main bearing unit 14, and can hence be pre-compensated. Basically, one executes the bearing journals on part "too high", such that they take their theoretical ideal position first when the rotor 4 is mounted. One would probably not only pre-compensate for the static deadweight, but e.g. also for the mean operating load which may be significantly different from just masses, such that only deviations from mean have an impact on gearbox- or generator-alignment.

In this embodiment of the invention there is a potential risk of some of the rolling elements 13 at some point running in a no-load condition. But rolling element bearings 14 and particularly roller bearing 14 do not like at all is running unloaded, not even locally around the circumference. Operation with/without load causes the rolling element 13 to run slower than its theoretical speed, and hence slide in the contact zone. Once the rolling element 13 enters the load zone, it first needs to accelerate, and this may cause skidding or smearing which eventually may destroy the main bearing unit 14. In another embodiment of the invention it could therefore be advantageous to modify the stiffness of bearing rings 7, 8, 9 or at least parts or the bearings 22, 23, 24, 28 to obtain a defined pre-load of the rolling element 13, just enough to maintain a defined minimum roller load under all operating conditions.

Figure 4:
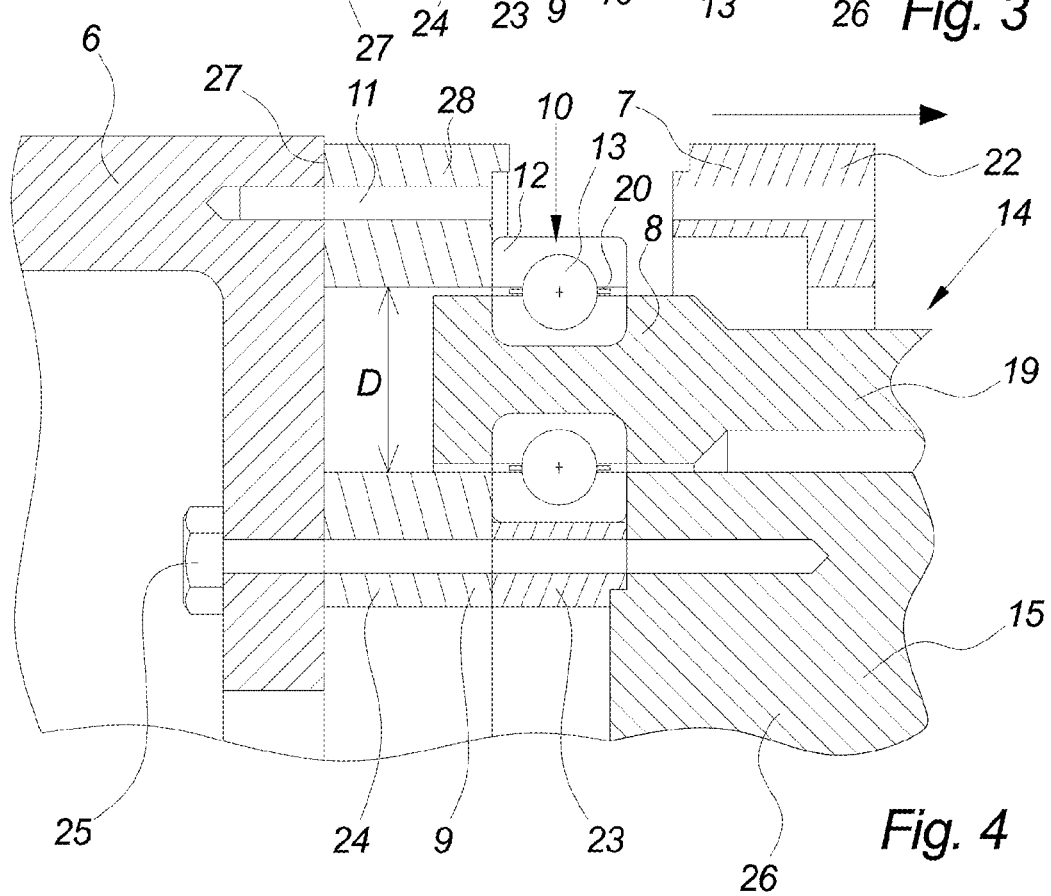
FIG. 4 illustrates the same embodiment as FIG. 3 with a first part of the outer ring axially displaced, as seen from the side.

FIG. 4 illustrates the same embodiment as shown in FIG. 3 with a first part of the outer ring 22 axially displaced, as seen from the side.

The present design of a main bearing unit 14 offers further advantages regarding the operation of the wind turbine 1 in that this design enables that the entire main bearing unit 14 or at least the wearing parts and/or the internal parts 12, 13, 20 of the main bearing unit 14 can be accessed, inspected and/or replaced without the rotor 4 having to be removed or fixated by additional complex equipment.

In this embodiment of the invention a first part of the outer ring 22 can be axially displaced to enable access to the internal parts 12,13,20 between the outer ring 7 and the centre ring 8.

In that the first part of the outer ring 22 is heavily loaded when radial and/or axially loads are transferred though the main bearing unit 14 the first part of the outer ring 22 is in this embodiment formed as a single closed ring completely enclosing the internal parts 12,13,20 between the outer ring 7 and the centre ring 8 but in that the inner ring 9 and the outer ring 7 are rigidly connected locally all the way around the main bearing unit 14 the first part of the outer ring 22 could also be formed as a number of individual segments.

In this embodiment of the invention the outer ring 7 further comprise comprises a second part of the outer ring 28 which in this embodiment is stationary during the inspection and/or the replacing of the internal parts 12,13,20 but in another embodiment the second part of the outer ring 28 could e.g. be divided into a number of segments and then removed during the inspection and/or the replacing of the internal parts 12,13, 20 to ensure better working conditions or other or the second part of the outer ring 28 could be formed as an integrated part of the hub 6 or other.

Figure 5:
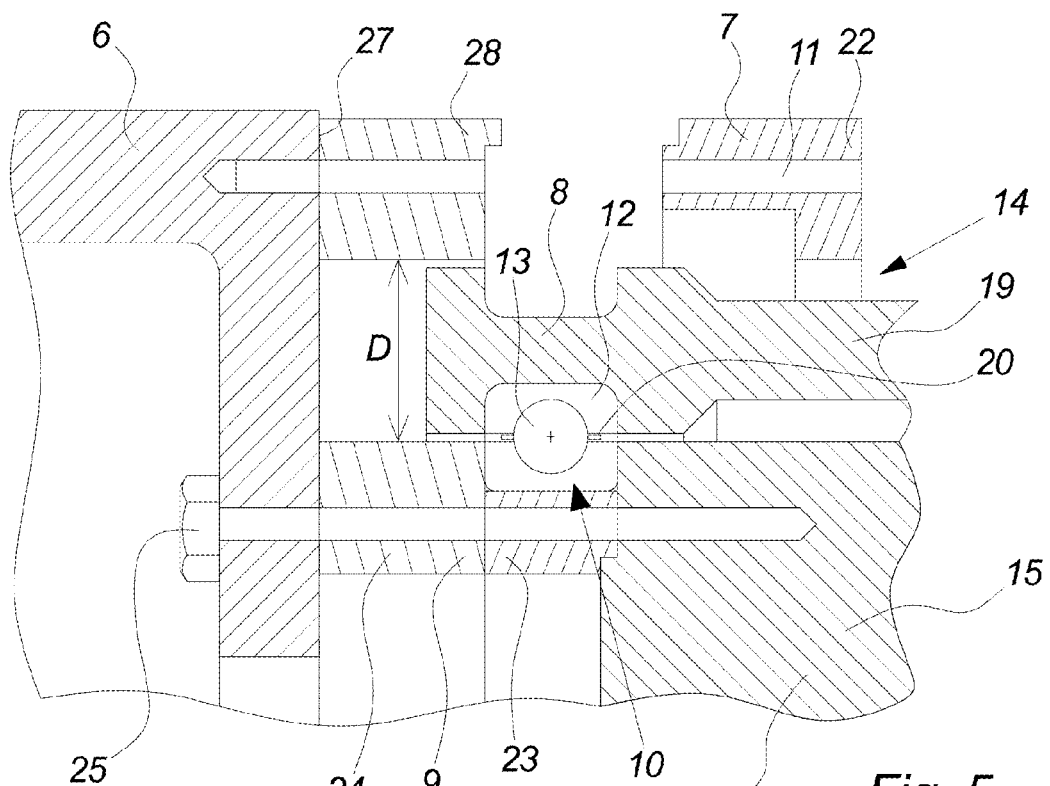
FIG. 5 illustrates the same embodiment as FIG. 3 with the internal parts between the centre ring and the outer ring removed, as seen from the side.

FIG. 5 illustrates the same embodiment as shown in FIG. 3 with the internal parts between the centre ring 8 and the outer ring 7 removed, as seen from the side.

When the first part of the outer ring 22 has been removed there is free access to the raceway 12 in the outer ring 7, the rolling elements 13, the cage 20 or cages 20 and the raceway 12 in the centre ring 8.

The main bearing unit 14 comprises one or more cages 20 to substantially maintain the individual rolling elements 13 position with respect to the other rolling elements 13 hereby maintaining a substantially constant and uniform distance between the rolling elements all the way around the main bearing unit 14.

In this embodiment the cage 20 is formed as a hoop of steel provided with a number of holes corresponding to the rolling elements 13. The cage 20 is further formed a one segment in that the hoop can be opened in one place to remove the cage 20 without having to remove the rolling elements 13.

In another embodiment the cage 20 could be divided into a number of segments or the cage 20 could be formed as two individual cages 20 running on either side of the rolling elements 13 and then connected between all or some of the rolling elements 13.

While the internal parts 12,13,20 between the outer ring 7 and the centre ring 8 are removed or just accessed the rolling elements 13 between the centre ring 8 and the inner ring 9 are maintained fully operational hereby enabling that the row or rows of rolling elements 13 between the centre ring 8 and the inner ring 9 can carry the entire weight and load of the rotor 4 and transfer it to the nacelle 3 and further on.

The rotation of the rotor 4 would of course have to be stopped before any of the rings 7,8,9 are dismantled or removed to ensure the safety of the personnel doing the repairs, to ensure the safety of the machinery and to reduce the load having to be transferred through the main bearing unit 14 during the repairs.

Figure 6:
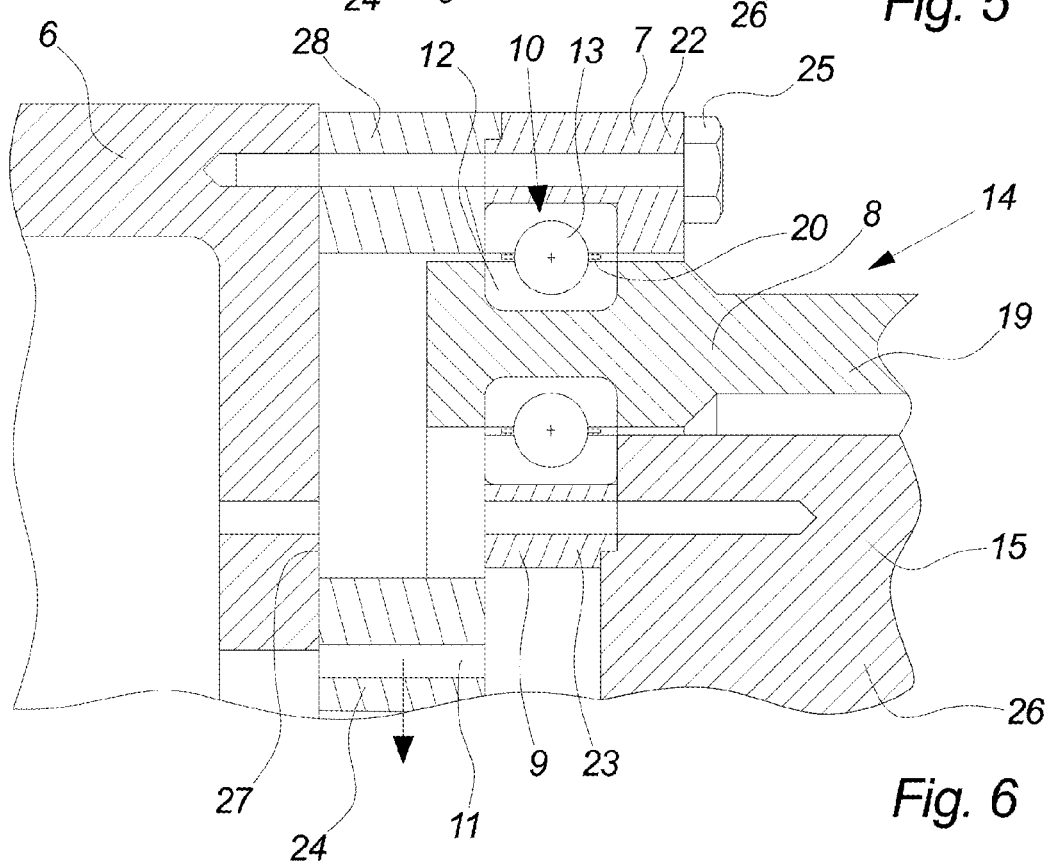
FIG. 6 illustrates the same embodiment as FIG. 3 with a first part of the inner ring radial displaced, as seen from the side.

FIG. 6 illustrates the same embodiment as shown in FIG. 3 with a first part of the inner ring 23 radial displaced, as seen from the side.

Because of the design of the main bearing unit 14 in this embodiment of the invention the first part of the inner ring 23 can not be removed before the second part of the inner ring 24 has been moved.

In this embodiment of the invention the first part of the inner ring 23 is formed as a full closed ring and therefore has to be moved axially but in another embodiment of the invention the first part of the inner ring 23 could be divided into a number of segments which could be removed radially.

In that the second part of the inner ring 24 in this embodiment is axially stuck between the hub flange 27 and the first part of the inner ring 23 the second part of the inner ring 24 is in this embodiment of the invention divided into a number of segments which can be removed radially as illustrated by the arrow in FIG. 6.

Figure 7:
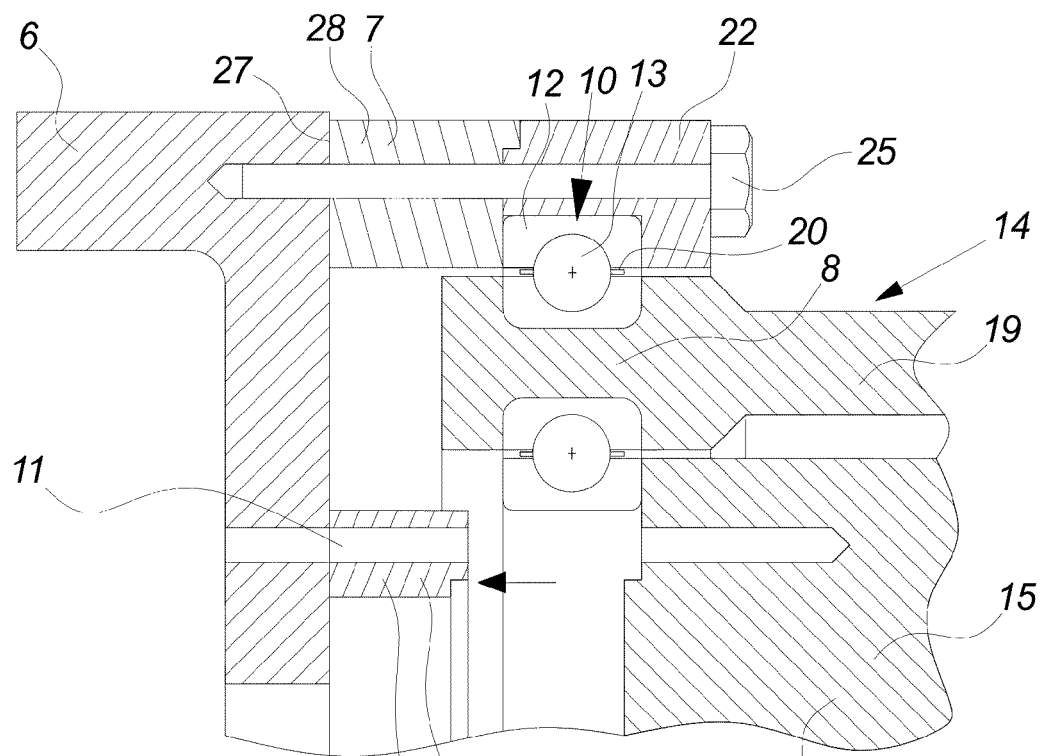
FIG. 7 illustrates the same embodiment as FIG. 3 with a second part of the inner ring axially displaced, as seen from the side.

FIG. 7 illustrates the same embodiment as shown in FIG. 3 with a second part of the inner ring 24 axially displaced, as seen from the side.

Once the second part of the inner ring 24 has been moved the first part of the inner ring 23 can be axially displaced to render access to the internal parts 12,13,20 between the inner ring 9 and the centre ring 8.

Figure 8:
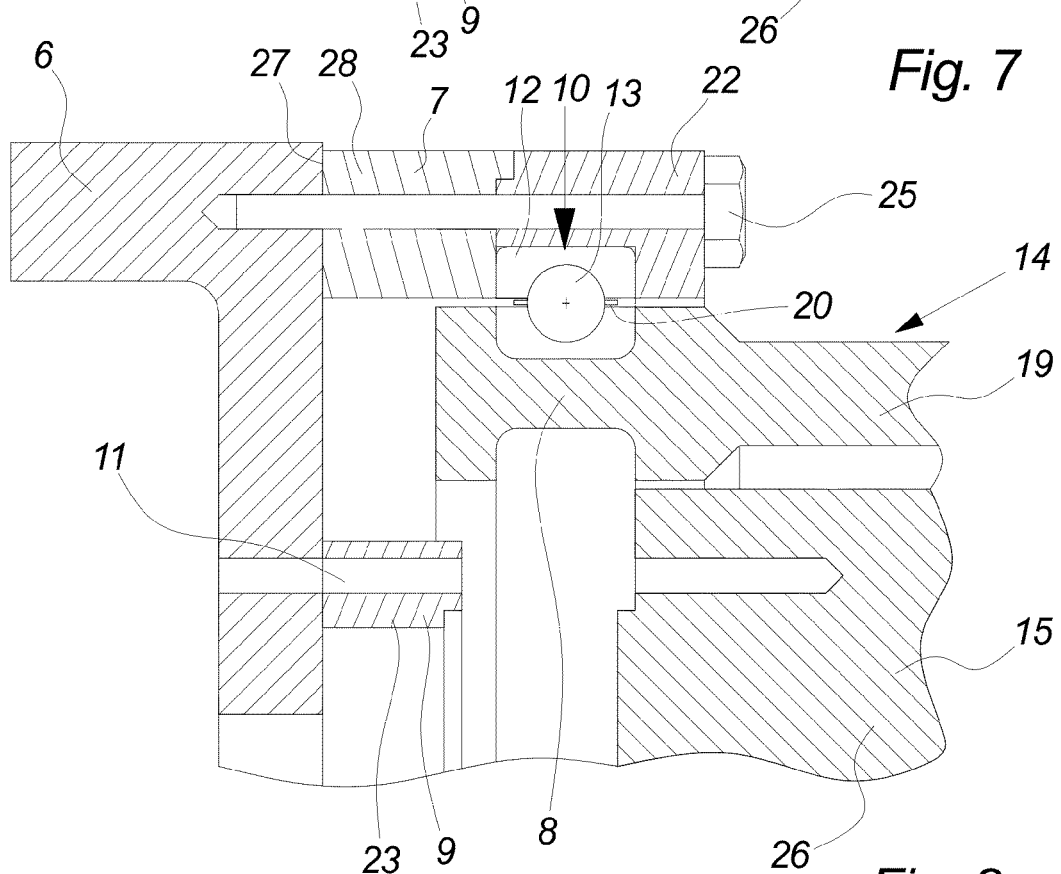
FIG. 8 illustrates the same embodiment as FIG. 3 with the internal parts between the centre ring and the inner ring removed, as seen from the side.

FIG. 8 illustrates the same embodiment as shown in FIG. 3 with the internal parts between the centre ring 8 and the inner ring 9 removed, as seen from the side.

When the first part of the inner ring 23 has been removed there is free access to the raceway 12 in the inner ring 7, the rolling elements 13, the cage 20 or cages 20 and the raceway 12 in the centre ring 8.

In this embodiment of the invention all four raceways 12 are divided into segments for easy removal and to enable that only a damaged part of the raceway 12 was removed.

In another embodiment of the invention only the raceway 12 in the centre ring 8 would be divided into segments whereas the raceways 12 in the inner ring 9 and outer ring 7 would be divided axially immediately over the highest point of the rolling elements 13 into two full separate rings e.g. connected by bolts to form a full raceway 12. If the cages 20 could be mounted after the raceways 12 have been positioned around the rolling elements 13, the raceways 12 in the inner ring 9 and outer ring 7 could also be formed as full circle rings.

In another embodiment of the invention the rings 7,8,9 are not provided with separate raceways 12 or at least only the centre ring 8 is provided with separate raceways 12 in that the raceways 12 could be formed integrally with the rings 7,8,9 resulting in that the entire rings 7,8,9 or at least the entire parts of the rings making contact with the rolling elements 13 would have to be exchanged in case of damage or wear to the raceway 12.

Like explained under FIG. 5 the rolling elements 13 between the centre ring 8 and the outer ring 7 remain load-transmitting while the internal parts 12,13,20 between the inner ring 9 and the centre ring 8 are removed or just accessed hereby enabling that the row or rows of rolling elements 13 between the centre ring 8 and the outer ring 7 can carry the entire weight and load of the rotor 4 and transfer it to the nacelle 3 and further on.

In the embodiments of a main bearing unit 14 illustrated in FIGS. 3 to 8 the rolling elements 13 of the main bearing unit 14 have been balls, there has only been one row 10 of rolling elements 13 between the inner ring 9 and the centre ring 8 and only one row 10 of rolling elements 13 between the outer ring 7 and the centre ring 8. But a wind turbine 1 with a main bearing unit 14 according to the invention can of course be designed in a number of different ways and in FIGS. 9 to 12 are illustrated a few specific embodiments of main bearing unit 14 for wind turbines 1.

Figure 9:
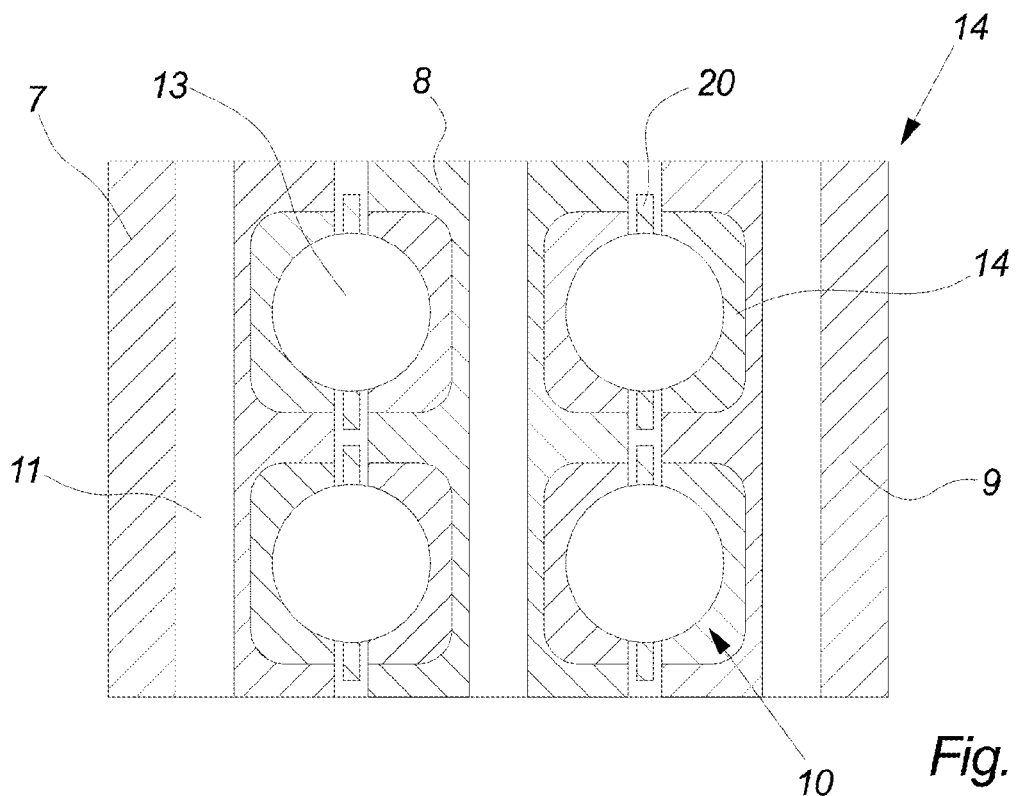
FIG. 9 illustrates a cross section of an embodiment of a main bearing unit comprising four rows of rolling elements, as seen from the side.

FIG. 9 illustrates a cross section of an embodiment of a main bearing unit 14 comprising two rows 10 of rolling elements 13 between the outer ring 7 and the centre ring 8 and two rows 10 of rolling elements 13 between the centre ring 8 and the inner ring 9.

The design of the main bearing unit 14 illustrated in FIG. 9 much resembles the design of the main bearing unit 14 illustrated in FIGS. 3 to 8 except for the fact the this main bearing unit 14 comprises two rows 10 of rolling elements 13 between the outer ring 7 and the centre ring 8 and two rows 10 of rolling elements 13 between the centre ring 8 and the inner ring 9.

In this embodiment of the invention all the rings 7,8,9 of the main bearing unit 14 comprise separate raceways 12. When the raceways 12 are separate from the rest of the rings 7,8,9 the raceways 12 are the typically made in a harder or more durable material than the rest of the bearing ring 7,8,9 and to be able to mount the raceways 12 in the rings 7,8,9 the raceways 12 could be divided into a number of segments as previously explained.

Figure 10:
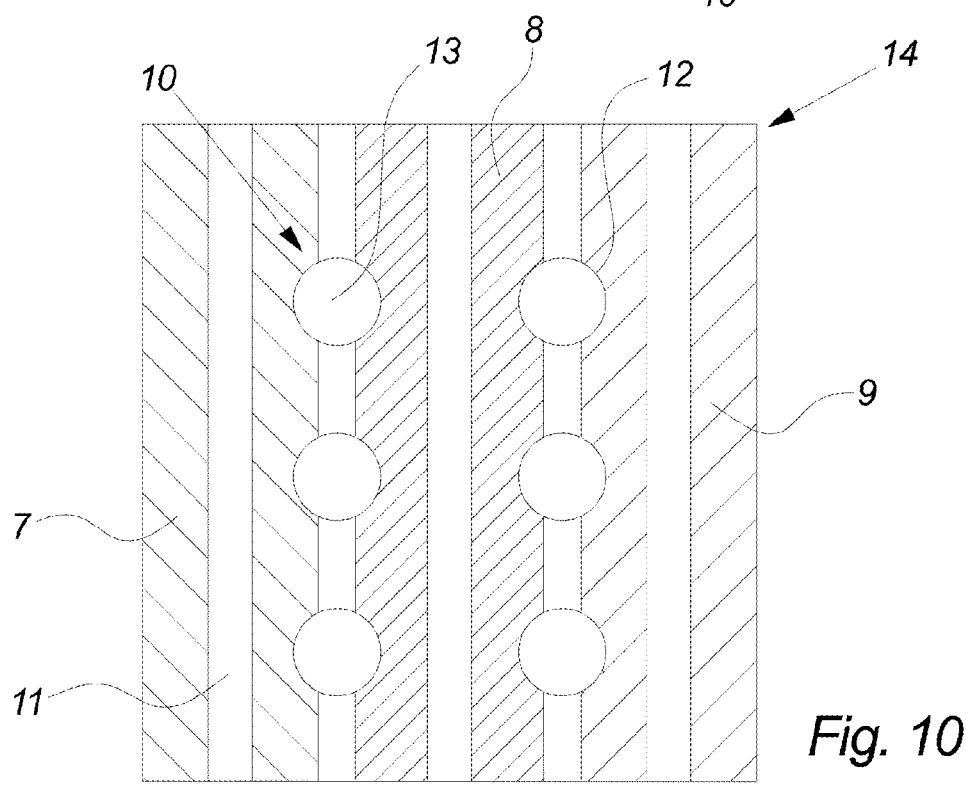
FIG. 10 illustrates a cross section of an embodiment of a main bearing unit comprising six rows of rolling elements, as seen from the side.

FIG. 10 illustrates a cross section of an embodiment of a main bearing unit 14 comprising three rows 10 of rolling elements 13 between the outer ring 7 and the centre ring 8 and three rows 10 of rolling elements 13 between the centre ring 8 and the inner ring 9.

The more rows of rolling elements 13 the more contact surface and the less load each rolling element 13 has to transfer. But the more rows the more complex and expensive the main bearing unit 14 becomes.

Figure 11:
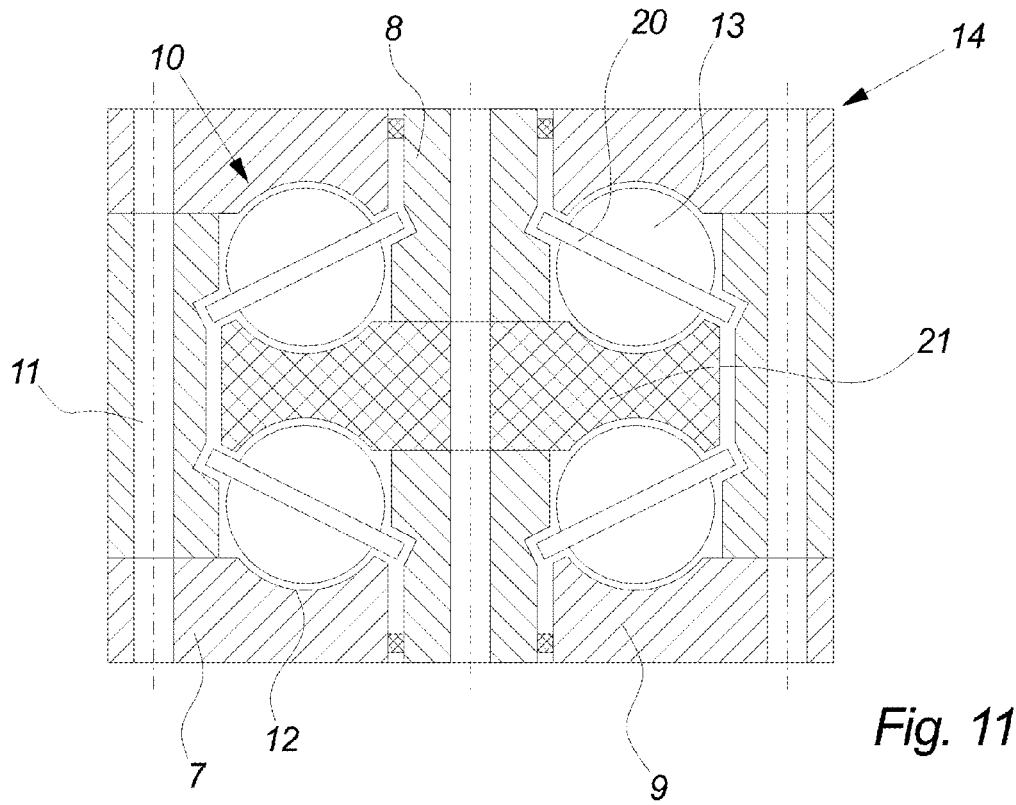
FIG. 11 illustrates a cross section of an embodiment of a main bearing unit comprising four rows of rolling elements and a centre part, as seen from the side.

FIG. 11 illustrates a cross section of an embodiment of a main bearing unit 14 comprising two rows 10 of rolling elements 13 between the outer ring 7 and the centre ring 8 and two rows 10 of rolling elements 13 between the centre ring 8 and the inner ring 9.

In this embodiment the centre ring 8 is further provided with a centre part 21 and the inner ring 9 and the outer ring 7 are U-shaped making this bearing type capable of transferring very high axial loads while still maintaining the advantages of being substantially self-tracking.

Figure 12:
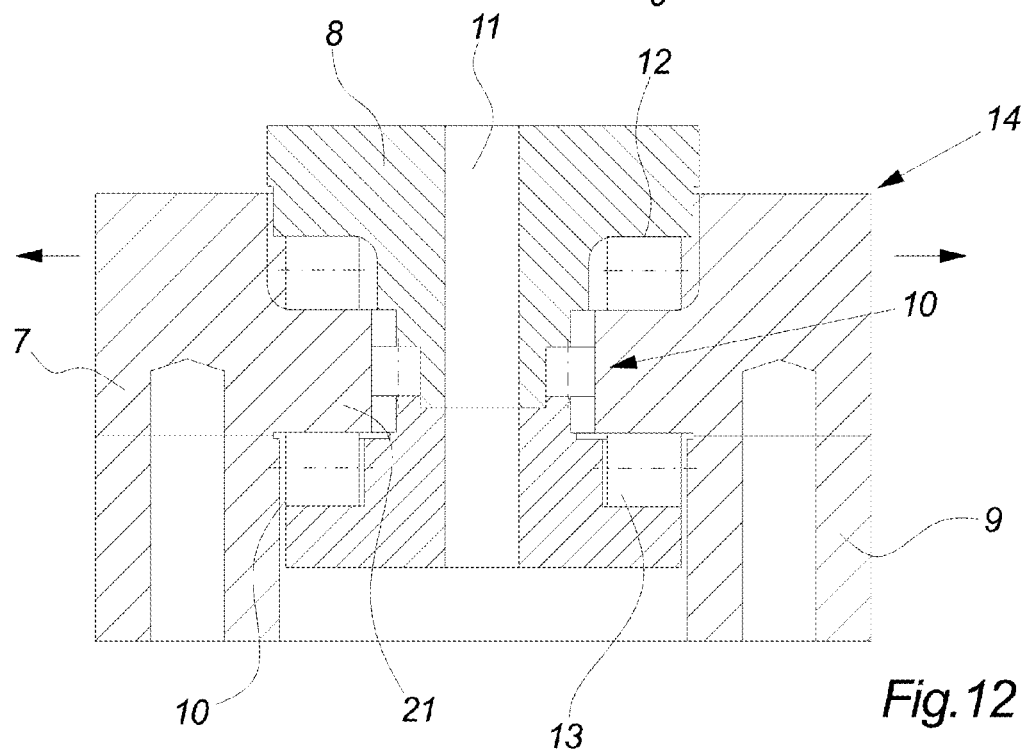
FIG. 12 illustrates a cross section of an embodiment of a main bearing unit comprising six rows of rolling elements acting in different directions, as seen from the side.

FIG. 12 illustrates a cross section of an embodiment of a main bearing unit 14 comprising three rows 10 of rolling elements 13 between the outer ring 7 and the centre ring 8 and three rows 10 of rolling elements 13 between the centre ring 8 and the inner ring 9.

In this embodiment the outer ring 7 and the inner ring 9 are provided with a centre part 21 making this bearing type capable of transferring very high axial loads.

In this embodiment the rolling elements 13 are all rollers but in another embodiment the rolling elements 13 could all be needles, balls or other or any combination thereof.

In this embodiment the main bearing unit 14 comprise four separate rows 10 of rolling elements 13 with rolling elements 13 of a first size and two further rows 10 of rolling elements 13 with rolling elements of a second size, where the rolling elements 13 in the four rows 10 are bigger than the rolling elements 13 in the two rows 10.

In another embodiment all the rolling elements 13 in the main bearing unit 14 could be of substantially uniform size or rows of different sized rolling elements 13 could be combined differently.

In this embodiment the rows 10 of rolling elements 13 between the inner ring 9 and the centre ring 8 are placed on two different pitch diameters and likewise the rows 10 of rolling elements 13 between the inner ring 9 and the centre ring 8 are placed on two different pitch diameters.

The invention has been exemplified above with reference to specific examples of designs and embodiments of wind turbines 1, main bearings units 14 and other. However, it should be understood that the invention is not limited to the particular examples described above but may be designed and altered in a multitude of varieties within the scope of the invention as specified in the claims.

What is claimed is:

1. A wind turbine comprising a nacelle and a rotor, said rotor being rotatably mounted on said nacelle by means of at least one main bearing unit characterized in that said main bearing unit comprises at least one outer ring, at least one centre ring being radially positioned inwardly in relation to said outer ring, a first bearing assembly disposed between said outer ring and said centre ring and having an outer race, an inner race, and rolling elements disposed between said outer and inner races, at least one inner ring being radially positioned inwardly in relation to said centre ring, a second bearing assembly disposed between said centre ring and said inner ring and having an outer race, an inner race, and rolling elements disposed between said outer and inner races, and wherein said centre ring is capable of rotation in relation to said outer ring and said inner ring, or said outer ring and said inner ring are capable of rotation in relation to said centre ring, subsequent to assembly of said wind turbine.

2. The wind turbine according to claim 1, wherein said at least one outer ring and said at least one inner ring are rigidly connected.

3. The wind turbine according to claim 1, wherein said at least one outer ring and said at least one inner ring are attached to a hub of said rotor.

4. The wind turbine according to claim 1, wherein said at least one centre ring is attached to a hub of said rotor.

5. The wind turbine according to claim 1, wherein at least one of said main bearing unit and said wind turbine comprises means for allowing said outer ring or at least a part of said outer ring to be displaced axially.

6. The wind turbine according to claim 1, wherein at least one of said main bearing unit and said wind turbine comprises means for allowing said inner ring or at least a part of said inner ring to be displaced axially.

7. A method for servicing said main bearing unit of said wind turbine according to claim 1, said method comprising the steps of moving said inner ring or a part of said inner ring of said main bearing unit while said centre ring and said outer ring of said main bearing unit remains load-transmitting, or moving said outer ring or a part of said outer ring of said main bearing unit while said centre ring and said inner ring of said main bearing unit remains load-transmitting.

8. The method according to claim 7, wherein said method further comprise the step of disengaging said inner ring or said part of said inner ring or said outer ring or said part of said outer ring from said main bearing unit.

9. The method according to claim 7, wherein said inner ring or said part of said inner ring is moved to gain access to internal parts between said centre ring of said main bearing unit and said inner ring.

10. The method according to claim 7 wherein said outer ring or said part of said outer ring is moved to gain access to internal parts between said centre ring of said main bearing unit and said outer ring.

11. The method according to claim 7, wherein said method is further a method to level out wear of one or more parts of said main bearing unit.

12. The method according to claim 11, wherein said one or more parts comprise a region of stationary bearing rings of said main bearing unit which are in direct contact with rolling elements of said main bearing unit.

13. The method according to claim 12, wherein said stationary bearing rings are one or more rings of said main bearing unit which are fixed in relation to said nacelle during normal operation of said wind turbine.

14. The method according to claim 7, wherein said rings or said part of said rings of said main bearing unit are reattached in a new angle-position.

15. A wind turbine comprising a nacelle and a rotor, said rotor being rotatably mounted on said nacelle by means of at least one main bearing unit characterized in that said main bearing unit comprises at least one outer ring, at least one centre ring being radially positioned inwardly in relation to said outer ring and at least one inner ring being radially positioned inwardly in relation to said centre ring and wherein said centre ring is capable of rotation in relation to said outer ring and said inner ring or said outer ring and said inner ring are capable of rotation in relation to said centre ring, wherein said at least one centre ring is formed integrally with a hub of said rotor.

* * * * *